United States Patent [19]

Sullivan

[11] Patent Number: 4,515,726

[45] Date of Patent: May 7, 1985

[54] OILSEED EXTRACTION PROCESS

[75] Inventor: Don A. Sullivan, Houston, Tex.

[73] Assignee: Shell Oil Company, Houston, Tex.

[21] Appl. No.: 625,491

[22] Filed: Jun. 28, 1984

[51] Int. Cl.³ .......................... C11B 1/00; C07F 5/02
[52] U.S. Cl. .................................................. 260/412.4
[58] Field of Search ........................ 260/412.4, 412.8

[56] References Cited

U.S. PATENT DOCUMENTS

| | | | |
|---|---|---|---|
| 2,524,037 | 10/1950 | Beckel et al. | 260/412.4 |
| 4,298,540 | 11/1981 | Youn et al. | 260/412.4 |
| 4,456,556 | 6/1984 | Grimsby | 260/412.4 |
| 4,456,557 | 6/1984 | Grimsby | 260/412.4 |
| 4,457,869 | 7/1984 | Grimsby | 260/412.4 |

Primary Examiner—J. E. Evans

[57] ABSTRACT

A process is provided for the recovery of a separate lecithin/phosphatide-rich product during the extraction of soybeans with an isopropanol-based solvent. The invention comprises steps for contacting soybeans with solvent to obtain an extracted seed meal and a solvent extract of seedoils and lecithin and related phosphatides, cooling miscella to a temperature in the range from about 30° to 80° F., phase separating the cooled miscella, recovering from the phase separation an upper solvent-rich phase, an intermediate lecithin/phosphatide-rich phase and a lower crude oil phase, and directly recycling the solvent-rich phase to the extractor.

7 Claims, 1 Drawing Figure

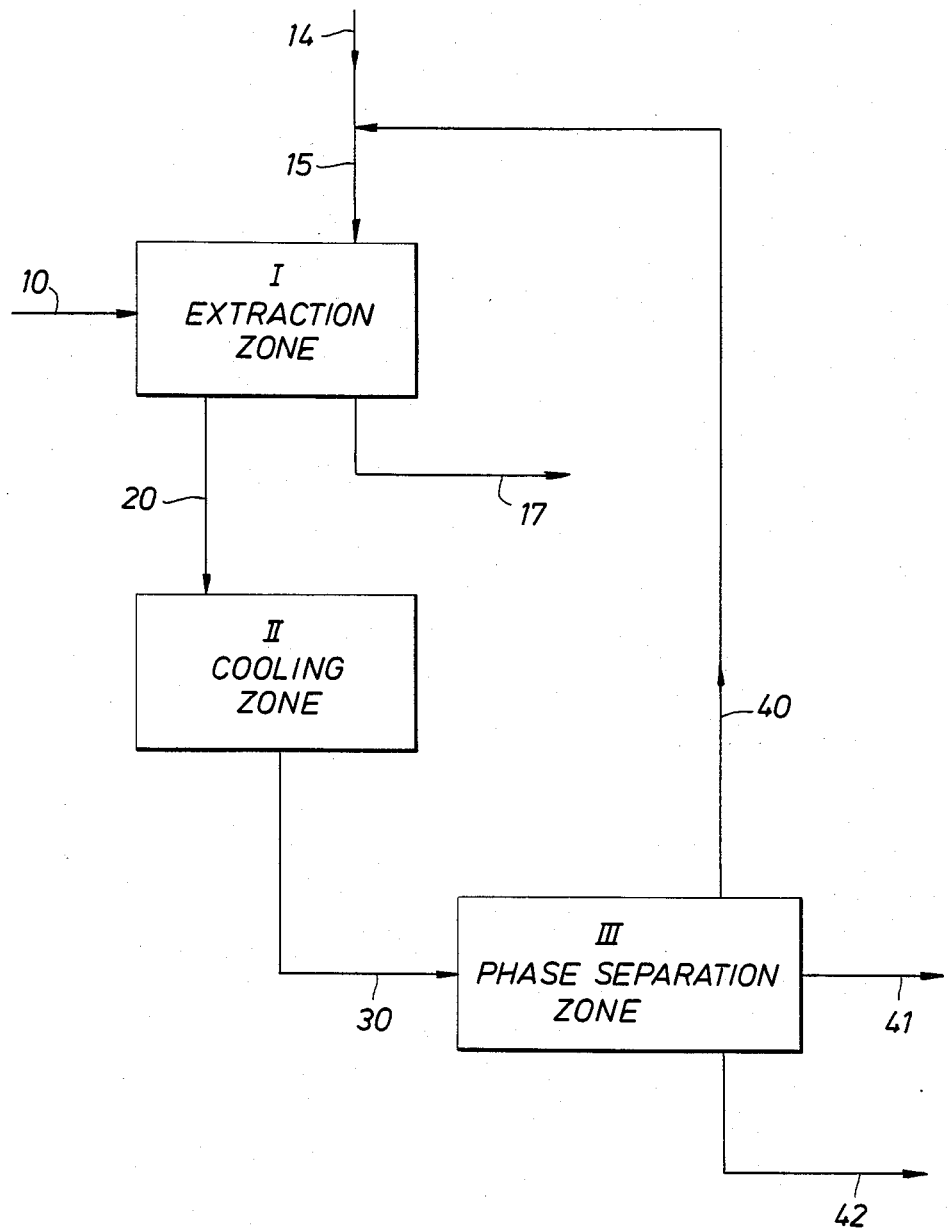

OILSEED EXTRACTION PROCESS

BACKGROUND OF THE INVENTION

The present invention relates to a process for the extraction of oils from oil-containing seeds, specifically soybeans. More particularly, the invention relates to such a process which provides not only for the extraction and recovery of oils from the seeds but also for the extraction and separate recovery of a lecithin/phosphatide product.

The oilseed industry of the United States produces on an annual basis about thirteen million tons of seedoils from approximately one billion bushels of seed crops, predominantly soybeans. Essentially all of this oil is recovered from the seeds by solvent extraction. Hexane is employed almost exclusively as the solvent in the U.S. today. The oils find primary use in foods, e.g., shortening, margarine, cooking oils, and salad oils, while seed meal from which the oil has been extracted, having a high protein content, is generally processed into animal feeds. About two percent of this meal is further refined for human consumption.

Contact of soybeans with hexane, or with other of the recognized oilseed extraction solvents, extracts not only oils but also significant quantities of other seed components. Of particular importance is a complex mixture of lecithin (phosphatidylcholine) and/or related phosphatide compounds. In part, the lecithin/phosphatide fraction is recovered and used to produce a by-product known in the art as commercial lecithin. In the United States approximately eighty million pounds of commercial lecithin are now produced each year in the course of soybean extraction. Commercial lecithin has recognized utility in a wide variety of services, for instance, as an emulsifier, stabilizer, surfactant, caloric source and/or antioxidant in foodstuffs, cosmetics, soaps, paints, inks, pharmaceuticals, etc. An even greater amount of the soybean lecithin/phosphatide fraction is recovered in the extraction process and then recombined with the extracted seed meal product, an exchange which both upgrades the quality of the oil and enhances the value of the meal as an animal feed.

The recovery of lecithin/phosphatide from oil in the conventional, commercial-scale hexane extraction process involves the extraction of soybeans with the hexane solvent to produce an extract miscella, the evaporation of hexane from the miscella, and the "degumming" of the remaining solution of lecithin/phosphatide in oil. For degumming, the solution is mixed with water at elevated temperature to convert the phosphatide compounds to their hydrate forms. The hydrates, known as gums, are insoluble in the oil and can be removed as a precipitate by settling or centrifugation.

Of particular relevance to the present invention are known processes for the extraction of soybeans with alcohol-based solvents, and specifically alcohol extraction processes in which separation of the extract miscella into solvent and oil is accomplished by phase separation. Solubility of vegetable oil in alcohol solvents is greatly dependent upon temperature. Relatively high solubility of the oils in a lower alcohol solvent at the temperature of the extractor, e.g., 160° to 180° F., permits effective extraction. The extract is subsequently cooled, e.g., to a temperature of about 80° F. or less, substantially lowering the solubility of solvent and oil and permitting their separate recovery by phase separation. The use of an alcohol-based solvent and of phase separation techniques for oil and solvent recovery has substantial advantage from the standpoint of process energy requirements over the use of hydrocarbon solvents and evaporation for the separation of solvent from oil. According to the prior art, a lecithin/phosphatide fraction is extracted from the soybeans by alcohol solvents and subsequently recovered from the miscella in a manner which resembles the degumming procedures which are applied to hexane extracted oils. For instance, Beckel et al report (in U.S. Pat. Nos. 2,445,931, 2,469,147, 2,505,749, and 2,524,037; in an article published in The Journal of the American Oil Chemists' Society, January, 1948, pages 10 and 11, and in an article published in Soybean Digest, May, 1949, pages 20 and 21) that the cooling and/or concentration by evaporation of an ethanol extracted miscella produces a precipitate of nonoil substances which is recovered from either solvent or oil by settling and/or centrifugaton. The nonoil substances are said to include both lecithin and crude sugars. A recent publication by E. C. Baker et al (The Journal of the American Oil Chemists'Society, vol. 60, July, 1983, pages 1271–1277) similarly describes the extraction of soybeans with an isopropanol solvent, the phase separation of resulting miscella into oil and solvent, and a degumming of the oil during subsequent storage by a settling of phosphorus containing compounds.

SUMMARY OF THE INVENTION

It has now been found that in a process for the extraction of soybeans with an isopropanol-based extraction solvent, a lecithin/phosphatide product can be produced in a manner which is distinctly different from conventional degumming practices. Specifically, it has been discovered that under certain processing conditions lecithin/phosphatide can be recovered, in the course of phase separation of the miscella, as a separate interlayer between the upper solvent-rich phase and the lower oil-rich phase.

Accordingly, the present invention may be described, in summary, as a process for the solvent extraction of soybeans which comprises steps for (a) continuously contacting in an extractor the soybeans with an isopropanol-based extraction solvent containing a recycle solvent and, optionally, a make-up solvent to obtain an extracted seed meal and an extract miscella, (b) withdrawing the meal from the process, (c) cooling the miscella to a temperature in the range from about 30° to 80° F., (d) phase separating the cooled miscella, (e) recovering from the phase separation an upper solvent-rich phase, an intermediate lecithin-rich phase, and a lower crude oil phase, and (f) directly and continuously recycling the solvent-rich phase to the extractor as the recycle solvent. The invention is further necessarily characterized by the provision that isopropanol in the recycle solvent account for at least 90 percent of the total isopropanol in the extraction solvent. In certain preferred practices, this provision is satisfied by an additional process step for mechanically draining absorbed extraction liquid from the seed meal.

The process of the invention is readily distinguished from prior art alcohol extraction processes in which a lecithin or gums product was recovered only as a semisolid precipitate from the oil, and not as a separate product phase above the oil. It has also been found that unlike the gums which formed in prior art processes, the lecithin/phosphatide fraction recovered under practice of the invention is essentially free of carbohydrates or sugars.

DESCRIPTION OF THE DRAWING

The invention is illustrated by the attached drawing, which depicts in a single FIGURE a simplified schematic flow diagram of a particular embodiment.

It is to be understood that the drawing omits a detailed showing of equipment, instrumentation, piping, valving, etc., which would be used in practicing the process, as provisions for such matters will be apparent to those skilled in the relevant processing arts.

Referring to the drawing, a soybean feedstock designated 10 is contacted with an isopropanol-based solvent 15 in an extraction zone (extractor) designated I. Contact of seeds and solvent extracts oils, phosphatides and other substances into a solvent extract or miscella. The liquid miscella is withdrawn from the extractor as stream 20 and introduced into a cooling zone II. The solid seed meal is substantially drained of absorbed extraction liquid and is withdrawn from the extraction zone and from the process as stream 17. In the cooling zone the miscella 20 is cooled to a temperature in the range from about 30° to 80° F., and the cooled miscella 30 is then introduced into a phase separation zone III. In this zone III, the miscella is separated into three distinct phases: an upper solvent-rich phase, an intermediate phase containing lecithin and/or related phosphatides, and a lower crude oil phase. These three phases are, in the embodiment shown, separately recovered from the phase separation vessel as streams 40, 41 and 42, respectively. Crude oil 42 is taken from the process and typically subjected to further processing, for instance, for solvent recovery and oil refining.

Solvent stream 40 is withdrawn from zone III and recycled directly and continuously to the extractor in zone I. As it is recovered from phase separation, this solvent is saturated with both oil and lecithin/phosphatide. Recycle solvent is combined with make-up solvent stream 14, to replace solvent carried from the process, for example, with the meal 17 and with the crude oil 42, and the combined steam 15 is introduced as extraction solvent into the extractor.

The lecithin/phosphatide rich phase is shown to be recovered from the phase separation vessel as stream 41.

DESCRIPTION OF THE PREFERRED EMBODIMENTS

The present invention is intended for application to the extractive recovery of oils and lecithin/phosphatide from a feedstock consisting essentially of soybeans. Although solvent extraction processes are generally applicable to other oil containing seeds, e.g., cottonseed, corn, peanut, safflower, sunflower, and palm, practice of the present invention requires a feedstock of relatively high lecithin/phosphatide content. Soybeans are known to contain a large amount of extractible lecithin/phosphatide relative to other oilseeds. In quantitative terms, extractible lecithin/phosphatide in soybeans averages about 2%w (percent by weight), calculated on extractible oils.

Extraction of the soybean feedstock is necessarily accomplished by contact with an isopropanol-based solvent. In most respects, this contact step suitably takes place employing extractor equipment and operating procedures well known in the prior art. Process conditions preferred for use in the extractive recovery of soybeans with isopropanol are described, for instance, in U.S. Pat. No. 4,298,540 to Youn and Wilpers. Illustrative of preferred conditions for the contact between soybeans and solvent are an extraction zone temperature in the range from about 60° to 95° C., a solvent which contains no more than about 18%w water and most preferably between about 10 and 16%w water (relative to the combined weight of water and isopropanol in the solvent), and a weight ratio of solvent to oilseed feedstock of between about 1.0 and 3.0. Particularly good results have been attained using a countercurrent extractor in which the soybean solids form a bed which is not subjected to continuous stirring or other agitation. The use of such an extractor appears to minimize the presence of lecithin/phosphatide gums as an impurity in the process crude oil product and may also facilitate the recovery of a lecithin/phosphatide fraction as an interlayer from the miscella phase separation.

The contact of soybeans and solvent in the extractor takes place in a continuous manner. Typically, soybeans and solvent are continuously introduced into the extractor and passed, preferably in countercurrent flow, through several distinct extraction stages.

The contact step results in the extraction of a substantial quantiy of seedoils and a lesser quantity of lecithin/phosphatide from the soybeans and produces an extract miscella solution and an extracted seed meal. Liquid is substantially drained from the solid meal before the meal is taken from the process. Conventional extractor equipment typically makes provision for the drainage of extraction liquids form extracted meal. For reasons which will be discussed in more detail hereinbelow, it is desirable in the practice of any process according to the invention that the drainage step achieve an essentially complete recovery of extraction liquid from the meal, for instance, a recovery in which less than about 10%, preferably less than about 7% more preferably less than about 5% and most preferably less than about 4% of the solvent introduced into the extractor (calculated on the basis of isopropanol content) remains in the meal following drainage of liquids. It is recognized in the art, particularly in U.S. Pat. No. 2,524,037, that leaving miscella in the meal acts to remove from the circulating solvent system quantities of extractibles including the lecithin/phosphatide fraction. For the invention of that patent, it was necessary that a significant portion of the miscella and its lecithin/phosphatide remain in the meal in order to prevent its uncontrolled build-up in a circulating ethanol solvent. Discoveries relative to the present invention have shown, however, that it is undesirable for significant quantities of miscella to remain in the meal. In the practice of the present invention, utilizing a circulating isopropanol solvent, lecithin/phosphatide is recoverable as a separate product before its concentration builds to a level which meaningfully interfers with extraction efficiency.

In most cases, an essentially complete removal of absorbed liquids from meal is not accomplished by gravity drainage (as is very commonly practiced in conventional extractors) and a mechanically-aided drainage of the meal is necessary. Examples of suitable means, one or more of which may be useful in aiding drainage of liquid from the meal, include a screw-press or expeller, a rolling mill, a plate press, a rotary filter, a vacuum filter, and a centrifuge. The application of mechanical drainage is known both for conventional hexane extraction processes (H. P. J. Jongeneelen, J. Am.

Oil Chem. Soc., June 1976, vol. 53, pages 291 and 292) and for isopropanol extraction processes.

Miscella is continuously withdrawn from the extractor and cooled to a temperature at which the solvent and the extracted oils are only slightly soluble. Miscella is cooled to a temperature which is preferably in the range from about 30° to 80° F., more preferably in the range from about 35° to 60° F. and most preferably in the range from about 35° to 45° F. The lower temperatures generally facilitate phase separation of miscella and, in particular, minimize the quantity of solvent that is taken from the process with the crude oil product.

As in conventional soybean extraction processes utilizing an isopropanol solvent, the cooling of the miscella results in a separation into distinct oil-rich and solvent-rich liquid phases. In addition, however, the invention also provides for the separation and recovery of a third, lecithin/phosphatide-rich phase, as an interlayer between the solvent and oil phases.

Separation and recovery of the three phases is suitably accomplished simply by allowing the cooled miscella to settle under action of gravity or by application of other forces, e.g., through centrifugation. As will be apparent to those skilled in the processing arts, recovery of the three phases can then be carried out in any number of ways. For example, there can be utilized a settling vessel with provision for withdrawal and recovery of the three separate phases at three separate levels in the vessel. Likewise, separation and recovery of the three phases can be carried out in a three phase centrifuge. In many cases, however, it is impractical to recover the three phases from one vessel or centrifuge, because of the small quantity of the lecithin/phosphatide phase relative to the oil phase and to the solvent phase. Accordingly, dual vessels or centrifuges may be preferred. For example, a first separation between the oil phase and the solvent and lecithin/phosphatide phases may be accomplished in a first vessel or centrifuge. The solvent and lecithin are then phase separated in and recovered from a second vessel or centrifuge. Such a second separation of lecithin from solvent, after recovery of oil, is further preferred because it provides opportunity for the recovery of a lecithin/phosphatide product of low oil content. If carried out at a temperature that is higher than that at which separation and recovery of the oil phase is accomplished, the second separation or any subsequent contact between the lecithin/phosphatide phase and the solvent phase has the result of removing oil from the lecithin/phosphatide product.

Recovery of the solvent phase from the phase separation step must be carried out continuously, in order to permit continuous solvent recycle. Recovery of the oil and lecithin phases may be carried out intermittently, if desired.

Under practice of the invention, the lecithin/phosphatide product which is recovered typically, but not necessarily, has a composition approximating that of commercial lecithin recovered form hexane extracted oil by convention degumming procedures. Application of this product of the invention can generally be made in the services in which the conventional commercial lecithin has found utility. In the alternative, the lecithin/phosphatide product can be recombined with seed meal, enhancing its nutritional value as an animal feed. For this purpose, the lecithin/phosphatide phase can be directly mixed with the meal downstream of the extractor (for instance, during the step commonly practiced for desolventizing and toasting the meal) or it can be returned to extractor, either alone or together with recycle solvent.

Following its separation and recovery from the oil and lecithin/phosphatide phases, solvent is necessarily recycled to the extraction zone. It is particularly important to the practice of the invention that phase separated solvent be recycled directly and continuously to the extraction zone. Recycle of this solvent is direct in the sense that it does not undergo processing steps which would significantly alter its composition. It has been common for conventional processes to include a treatment of the recycle solvent stream, particularly a distillation or evaporation step, to control (reduce) its content of water, seedoils, carbohydrates, phosphatides, and other substances. Such treatments are to be avoided in the process of the invention, at least to the extent that they have significant influence upon achieving and maintaining a concentration of lecithin/phosphatide in the circulating solvent sufficient to permit recovery of the lecithin/phosphatide phase during the phase separation step.

For similar reasons, it is critical to the performance of the invention that recycle solvent account for a relatively large proportion of the total extraction solvent. Typically, in any such process, the total extraction solvent will include not only recycle solvent but also a "make-up" solvent to replace that carried from the circulating solvent system together with the seed meal taken from the extractor and with the oil phase and the lecithin/phosphatide phase taken from the phase separator. Because the lecithin/phosphatide concentration in the solvent system must be maintained at a relatively high level, and because the make-up solvent typically contains little if any lecithin/phosphatide, it has been found necessary to the performance of the overall process that recycle solvent account for at least about 90% of total solvent introduced into the extraction zone (calculated on the basis of isopropanol content). The greater the proportion of recycle solvent, the greater the recovery of lecithin/phosphatide in the phase separation step. Thus, of the total extraction solvent, preferably at least about 93%, more preferably at least about 95%, and most preferably at least about 96% is solvent recovered from the phase separation and recycled directly to the extraction zone.

With direct recycle, lecithin/phosphatide in the circulating solvent is maintained at a concentration level which exceeds that of saturation under phase separation conditions, resulting in formation of a third lecithin/phosphatide-rich phase. It will be apparent that if practice of such a process is commenced without direct solvent recycle, for instance, if a process is started-up with a fresh isopropanol solvent, a number of cycles of the solvent through the process will be necessary to reach a substantially steady-state operation characterized by a build-up of extracted lecithin/phosphatide to the saturation level. In general, about 5 to 20 cycles are typically required. The failure of the prior art (e.g., the aforementioned publication of Baker et al) to observe the formation or achieve the recovery of a third (intermediate) lecithin/phosphatide phase in processes carried out utilizing steps and conditions similar to those of the present invention is perhaps attributable to the fact that such processes were not carried out in a continuous manner through a sufficient number of cycles. It is also thought that the practice of the invention using a nonstirred bed, countercurrent extractor may aid in lessening the number of solvent cycles necessary at start-up.

The invention is further illustrated with reference to the following Example.

EXAMPLE

A process is accordance with the invention was carried out, using pilor plant scale equipment, for the recovery of oil and lecithin from a soybean feedstock. An extractor of conventional design was continuously fed with 150 lb/hr of flaked (about 10 mil thickness) soybeans having a water content of about 10 to 11%w. An isopropanol based solvent, containing isopropanol and water in approximately azeotropic proportion, i.e., 88%w isopropanol and 12%w water, was continuously circulated through a bed of soybeans in the extractor at a flowrate which averaged about 3 times by weight that of the soybean feed rate. In the extractor, the seeds were contacted with solvent first in a cocurrent wash stage and then in multiple countercurrent extraction stages. Extraction was carried out at a temperature of about 172° F. and with a total residence time for contact of seeds and solvent of about 40 minutes.

A mechanical press was employed to aid drainage of liquid from the meal. The extracted meal leaving the press contained about 20%w liquid. Extract miscella was continuously withdrawn from the extractor. The miscella was cooled to a temperature of about 45° F., and introduced into a phase separation vessel having a volume of about 50 gal. In the phase separation vessel, the miscella separated by gravity into an upper solvent-rich phase which was continuously withdrawn and recycled to the extractor and a lower phase which was continuously withdrawn as a crude oil product. After the circulating solvent stream reached saturation with lecithin and/or related phosphatides, a third phase formed and was allowed to accumulate at the solvent-/oil interface in the phase separation vessel.

After thirty hours of operation, the process was discontinued. The intermediate phase was then recovered as a small quantity of a material having the appearance of conventional lecithin gums. Chemical analysis confirmed that the composition of this phase (designated "A") was comparable to that of a typical commercial lecithin product (designated "B") obtained from soybeans by conventional degumming techniques:

| | % w of acetone insolubles | % w | | | Molar Ratio | |
|---|---|---|---|---|---|---|
| | | P | Ca | Mg | Mg/Ca | (Mg + Ca)/P |
| A | 65 | 2.11 | 0.028 | 0.019 | 2.43 | 0.024 |
| B | 65 | 2.06 | 0.03 | 0.022 | 2.25 | 0.027 |

The intermediate phase was also determined to be essentially free of carbohydrates. Analysis of the crude oil recovered in the process indicated that it was of high quality, essentially free of phosphatides.

What is claimed is:

1. A process for the solvent extraction of oil and of lecithin and/or related phosphatide compounds from soybeans, comprising steps for (a) continuously contacting in an extractor the soybeans with an isopropanol-based extraction solvent containing a recycle solvent and, optionally, a make-up solvent to obtain a miscella extract and a seed meal (b) substantially draining liquid from the seed meal and withdrawing the drained seed meal from the process, (c) cooling the miscella to a temperature in the range from about 30° to 80° F., (d) phase separating the cooled miscella, (e) recovering from the phase separation an upper solvent-rich phase, an intermediate lecithin/phosphatide-rich phase, and a lower crude oil phase, and (f) directly and continuously recycling the solvent-rich phase to the extractor as the recycle solvent, with the provision that the quantity of isopropanol contained in the recycle solvent is at least about 90% of the total isopropanol in the extraction solvent.

2. The process of claim 1 including a step for mechanically draining liquids from the meal before it is withdrawn from the process.

3. The process of claim 2, wherein the quantity of isopropanol contained in the recycle solvent is at least about 93% of the total isopropanol in the extraction solvent.

4. The process of claim 3, wherein the miscella is cooled to a temperature in the range from about 35° to 60° F.

5. The process of claim 4, wherein the quantity of isopropanol contained in the recycle solvent is at least about 95% of the total isopropanol in the extraction solvent.

6. The process of claim 5, wherein the miscella is cooled to a temperature in the range from about 35° to 45° F.

7. The process of claim 6, wherein the quantity of isopropanol contained in the recycle solvent is at least about 97% of the total isopropanol in the extraction solvent.

* * * * *